United States Patent [19]

Miale

[11] Patent Number: 4,477,582

[45] Date of Patent: Oct. 16, 1984

[54] REACTIVATION OF STEAM-DEACTIVATED CATALYSTS

[75] Inventor: Joseph N. Miale, Lawrenceville, N.J.

[73] Assignee: Mobil Oil Corporation, New York, N.Y.

[21] Appl. No.: 463,746

[22] Filed: Feb. 4, 1983

Related U.S. Application Data

[63] Continuation-in-part of Ser. No. 249,584, Mar. 31, 1981, abandoned.

[51] Int. Cl.$^3$ ............... B01J 29/38; B01J 29/06; C10G 11/05
[52] U.S. Cl. .................... 502/26; 208/120; 502/77; 502/86
[58] Field of Search ............ 252/412, 455 Z; 208/120; 502/26, 77, 86

[56] References Cited

U.S. PATENT DOCUMENTS

| | | | |
|---|---|---|---|
| 2,814,598 | 11/1957 | Swegler | 252/412 |
| 3,493,490 | 2/1970 | Plank et al. | 252/412 |
| 3,684,738 | 8/1972 | Chen | 252/412 |
| 3,835,030 | 9/1974 | Mattox et al. | 252/455 Z |
| 4,085,069 | 4/1978 | Alafandi et al. | 252/455 Z |
| 4,268,376 | 5/1981 | Foster | 208/120 |
| 4,324,696 | 4/1982 | Miale | 252/455 Z |
| 4,357,265 | 11/1982 | Chiang | 252/455 Z |
| 4,375,573 | 3/1983 | Young | 585/475 |

Primary Examiner—P. E. Konopka
Attorney, Agent, or Firm—Alexander J. McKillop; Michael G. Gilman; Dennis P. Santini

[57] ABSTRACT

A process is provided for reactivating a catalyst composition comprising a crystalline zeolite material having a silicon/aluminum atomic ratio of at least about 3.5, said catalyst composition having been deactivated by contact with steam. The method involves the necessary steps of contacting said steam-deactivated catalyst composition with a metal salt solution, followed by contacting said metal salt solution contacted catalyst composition with an aqueous ammonium ion-containing solution.

9 Claims, No Drawings

REACTIVATION OF STEAM-DEACTIVATED CATALYSTS

CROSS-REFERENCE TO RELATED APPLICATION

This is a continuation-in-part of application Ser. No. 249,584, filed Mar. 31, 1981, now abandoned.

BACKGROUND OF THE INVENTION

1. Field of the Invention

This invention relates to a process for reactivating certain catalyst compositions comprising crystalline materials which have been steam-deactivated, said method involving the sequential steps of contacting said deactivated catalyst composition with a metal salt solution followed by contacting the metal salt solution contacted composition with a solution comprising a hydrogen ion precursor.

2. Description of Prior Art

Zeolitic materials, both natural and synthetic, have been demonstrated in the past to have catalytic properties for various types of hydrocarbon conversion. Certain zeolitic materials are ordered, porous crystalline alumminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. The zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), ZSM-35 (U.S. Pat. No. 4,016,245), ZSM-38 (U.S. Pat. No. 4,046,859), and zeolite ZSM-23 (U.S. Pat. No. 4,076,842), merely to name a few.

The silicon/aluminum atomic ratio of a given zeolite is often variable. For example, zeolite X can be synthesized with silicon/aluminum atomic ratios of from 1 to 1.5; zeolite Y, from 1.5 to about 3. In some zeolites, the upper limit of the silicon/aluminum atomic ratio is unbounded. ZSM-5 is one such example wherein the silicon/aluminum atomic ratio is at least 2.5 and up to infinity. U.S. Pat. No. 3,941,871 (U.S. Pat. No. Re. 29,948) discloses a porous crystalline silicate made from a reaction mixture containing no deliberately added aluminum in the recipe and exhibiting the X-ray diffraction pattern characteristic of ZSM-5 type zeolites. U.S. Pat. Nos. 4,061,724, 4,073,865 and 4,104,294 describe crystalline silicas of varying aluminum and metal content.

The reactivation of steam-deactivated catalysts comprising zeolites has been a prime objective of the petrochemical and refining industries. The importance of catalysts comprising zeolites having a high silicon/aluminum atomic ratio, e.g. greater than about 3.5, in the petrochemical industry, and the likelyhood of such catalysts being deactivated by steam contact, makes their reactivation following steam deactivation especially important. In contrast to coke-deactivated catalysts which can be readily regenerated by air oxidation, no adequate technique has been heretofore developed for reactivation of steam-deactivated catalysts. Steam deactivation apparently involves removal of aluminum from zeolitic framework, a result which until now has been believed to be largely irreversible. The present method provides a convenient way to reactivate steam-deactivated catalysts. This will prove to be useful and, in fact, valuable in numerous process applications.

It is noted that U.S. Pat. Nos. 3,354,078 and 3,644,220 relate to treating crystalline aluminosilicates with volatile metal halides, including aluminum chloride. Neither of these latter patents is, however, concerned with treatment of catalysts comprising zeolites, especially zeolites having initially a high silicon/aluminum atomic ratio, which have been deactivated by contact with steam.

Various methods for regeneration of coke-deactivated catalysts comprising zeolites with a silicon/aluminum atomic ratio of less than 3.5 are exemplified by the methods taught in U.S. Pat. Nos. 3,493,490; 3,835,030; 4,085,069 and 4,268,376. A siliceous cracking catalyst comprised of naturally occurring clays or synthetically prepared composites such as silica-alumina having been coke-deactivated may be regenerated by the method taught in U.S. Pat. No. 2,814,598.

U.S. Pat. No. 3,684,738 teaches a method for reactivating a coke-deactivated catalyst comprising a crystalline aluminosilicate characterized by a silica/alumina mole ratio of greater than about 6 and a pore size of from about 5 to 13 angstroms. The method of the latter patent involves the sequential steps of burning the coke from the catalyst, contacting the catalyst with an ammonium chloride solution under specified conditions, washing the catalyst with water, air drying and then calcining the catalyst.

Other methods for reactivating spent catalysts include those taught in U.S. Pat. Nos. 3,533,959; 2,635,080; 4,055,482; 4,107,031; 4,139,433; 4,219,441; 2,981,676; 3,692,692; 3,835,028; 2,752,289 and 2,842,503. U.S. Pat. No. 3,533,959 teaches a method for reactivation of aluminosilicate catalyst which has lost activity by exposure to heat or steam which involves contact with a cation-containing agent capable of chelating with aluminum at a pH between 7 and 9. U.S. Pat. No. 2,635,080 discloses reactivating a platinum-containing alumina catalyst by treating same with a solution of metal nitrate and metal chloride, while U.S. Pat. Nos. 4,055,482; 4,107,031 and 4,139,433 generally disclose reactivation of zeolite catalysts by treatment with ammonia solutions. U.S. Pat. No. 4,219,441 discloses reactivation of zeolite catalyst by contact with alkali or alkaline earth metal ions.

Further methods are exemplified by U.S. Pat. Nos. 4,190,553 and 4,043,938. The former patent discloses the sequential steps of contacting a coke-deactivated catalyst with ammonium hydroxide and then with an aqueous ammonium salt solution. The latter patent discloses reactivating zeolites by contact with a bivalent metal salt solution followed by treatment with ammonia gas (having a small water content). The ammonia gas is taught to serve as a drying agent with essentially no bivalent metal replacement taking place.

SUMMARY OF THE INVENTION

The present invention relates to a novel process for reactivation, i.e. improving acid activity, of certain catalyst compositions comprising crystalline zeolites having a silicon/aluminum atomic ratio of at least 3.5, especially those zeolites having high silicon/aluminum atomic ratios of greater than 6, such as, for example, greater than 25, which have been deactivated by contact with steam. The present process comprises the steps of contacting said steam-deactivated catalyst composition with a metal salt solution, such as, for example, sodium nitrate, followed by contacting said catalyst composition with a hydrogen ion precursor solution, such as, for example, an aqueous solution containing ammonium ions. The resulting reactivated catalyst composition exhibits enhanced Bronsted acidity and, therefore, improved acid activity toward catalysts of numerous chemical reactions, such as, for example cracking of organic, e.g. hydrocarbon, compounds.

The entire contents of application Ser. No. 249,584, filed Mar. 31, 1981, the parent of this continuation-in-part application, are incorporated herein by reference.

EMBODIMENTS

The novel process of this invention is concerned with the treatment of catalysts comprising crystalline material having a silicon/aluminum atomic ratio of at least 3.5, especially those crystalline materials having high silicon/aluminum atomic ratios of greater than 6, such as, for example, greater than 25, which have been steam-deactivated. The expression "high silicon crystalline material" is intended to define a crystalline structure which has a silicon/aluminum atomic ratio greater than about 6, more preferably greater than about 25, still more preferably greater than about 50, up to and including those highly siliceous materials where the silicon/aluminum atomic ratio is as reasonably close to infinity as practically possible. This latter group of high silicon crystalline materials is exemplified by U.S. Pat. Nos. 3,941,871; 4,061,724; 4,073,865 and 4,104,294 wherein the materials are prepared from reaction solutions which involve no deliberate addition of aluminum. Small quantities of aluminum are usually present in reaction solutions from which high silicon crystalline material is to be synthesized. It is to be understood that the expression "high silicon crystalline material" also specifically includes those materials which have other metals besides silicon and/or aluminum associated therewith, such as boron, iron, chromium, etc.

The novel method of this invention is simple and easy to carry out although the results therefrom are unexpected and dramatic. The first necessary step of the present process involves contacting a steam-deactivated catalyst composition comprising crystalline zeolite material, said zeolite material having a silicon/aluminum atomic ratio of at least about 3.5, with a metal salt solution, such as the nitrate, sulfate, carbonate, phosphate, halide and the like. The second necessary step of the process involves contacting the metal salt solution contacted composition with a hydrogen ion precursor, such as, for example, an aqueous ammonium ion-containing solution.

Certain optional steps may be employed to tailor reactivation of steam-deactivated catalyst hereby. The first optional step involves water washing the product catalyst from the above first necessary step. Another optional step involves drying, such as in air, the product catalyst from the above second necessary step. Such drying may be accomplished by heating the product catalyst at a temperature of from about 100° C. to about 200° C. in air. Also, the product catalyst from the above second necessary step or after drying may be calcined at a temperature of from about 200° C. to about 600° C. in an inert atmosphere of air, nitrogen, etc. at subatmospheric, atmospheric or superatmospheric pressure for from about 1 minute to about 48 hours.

The first necessary metal salt solution contacting step may be accomplished at a temperature of from about 20° C. to about 100° C. The contact time for this step may be from about 15 minutes to about 240 minutes. The concentration of the metal salt solution utilized is not narrowly critical and may vary from about 0.05 normal (N) to about 5 normal, preferably from about 0.1 normal to about 2 normal.

The metal salt solution for use in the first necessary step of the present process will be aqueous and may contain any water soluble metal salt, wherein the anion may be, for example, nitrate, nitrite, sulfate, sulfite, carbonate, bicarbonate, phosphate, phosphite, halide, acetate, oxylate and the like. Nitrates are particularly preferred. The metal or cation portion of the salts contemplated for use herein may be any metal which forms a water soluble salt and particularly includes alkali metals, alkaline earth metals, Group III metals of the Periodic Table and the transition metals. More specifically, metal cations contemplated herein include, for example, sodium, lithium, potassium, barium, magnesium, calcium, strontium, aluminum, iron, nickel, cobalt, copper, cadmium, zinc and the like. Particularly preferred metal cations are the alkali metals, such as sodium. Zinc is also a preferred metal. Thus, particularly preferred metal salts herein are sodium nitrate and zinc nitrate.

The second necessary step of the present process involves contact of the metal salt solution contacted catalyst composition with a hydrogen ion precursor solution such as aqueous ammonium ion-containing solutions, the anion portion of which may be the same or different from that of the metal salt utilized in the first necessary step. Thus, ammonium nitrates, nitrites, sulfates, sulfites, phosphates, phosphites, acetates, oxylates, carbonates, bicarbonates, halides and the like may be utilized. The concentration of the hydrogen ion precursor solution may vary from about 0.05 normal to about 5 normal, preferably from about 0.1 normal to about 2 normal. Contact time for this step of the process is from about 15 minutes to about 240 minutes and contact temperature is maintained at from about 20° C. to about 100° C.

Of the catalysts comprising crystalline zeolites having a silicon/aluminum atomic ratio of at least 3.5 which are advantageously reactivated after steam deactivation by the present process, those comprising zeolites of intermediate or large pore structure are noted. Intermediate pore structure zeolites provide a selective constrained access to and egress from the intracrystalline free space by virtue of having an effective pore size intermediate between the small pore Linde A and the large pore Linde X, i.e. the pore windows of the structure are of about a size such as would be provided by 10-membered rings of silicon atoms interconnected by oxygen atoms. It is to be understood, of course, that these rings are those formed by the regular disposition of the tetrahedra making up the anionic framework of the crystalline zeolite, the oxygen atoms themselves being bonded to the silicon (or aluminum, etc.) atoms at the centers of the tetrahedra. Intermediate pore structure zeolites freely sorb normal hexane while access in the larger molecules is constrained. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded.

A simple determination of "Constraint Index" as herein defined may be made to determine degree of constrained access to molecules larger in cross-section than normal paraffins, and thereby whether a particular zeolite is composed of large or intermediate pores. Constraint Index may be determined by passing continuously a mixture of an equal weight of normal hexane and 3-methylpentane over a sample of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 540° C. for at least 15 minutes. The zeolite is then flushed with helium and the temperature is adjusted between 290° C. and 510° C. to give an overall conversion of between 10% and 60%. The mixture of hydrocarbons is passed at 1 liquid hourly space velocity (i.e. 1 volume of liquid hydrocarbon per volume of zeolite per hour) over the zeolite with a helium dilution to give a helium to (total) hydrocarbon mole ratio of 4:1. After 20 minutes on stream, a sample of the effluent is taken and analyzed, most conveniently by gas chromotography, to determine the fraction remaining unchanged for each of the two hydrocarbons.

While the above experimental procedure will enable one to achieve the desired overall conversion of 10 to 60% for most zeolite samples and represents preferred conditions, it may occasionally be necessary to use somewhat more severe conditions for samples of very low activity, such as those having an exceptionally high silicon/aluminum atomic ratio. In those instances, a temperature of up to about 540° C. and a liquid hourly space velocity of less than one, such as 0.1 or less, can be employed in order to achieve a minimum total conversion of about 10%.

The "Constraint Index" is calculated as follows:

$$\text{Constraint Index} = \frac{\log_{10}(\text{fraction of hexane remaining})}{\log_{10}(\text{fraction of 3-methylpentane remaining})}$$

The Constraint Index approximates the ratio of the cracking rate constants for the two hydrocarbons. Intermediate pore size zeolites include those having a Constraint Index of from 1 to 12. Large pore size zeolites generally include those having a Constraint Index of less than about 1. Constraint Index (CI) values for some typical materials are:

| Zeolite | C I |
|---|---|
| ZSM-4 | 0.5 |
| ZSM-5 | 8.3 |
| ZSM-11 | 8.7 |
| ZSM-12 | 2 |
| ZSM-20 | less than 1 |
| ZSM-23 | 9.1 |
| ZSM-35 | 4.5 |
| ZSM-38 | 2 |
| ZSM-48 | 3.4 |
| TMA Offretite | 3.7 |
| Clinoptilolite | 3.4 |
| Beta | 1.6 |
| H-Zeolon (mordenite) | 0.4 |
| REY | 0.4 |
| Amorphous Silica-Alumina | 0.6 |
| Erionite | 38 |

Zeolite ZSM-20 is described in U.S. Pat. No. 3,972,983, the entire contents of which are incorporated herein by reference. Zeolite Beta is described in U.S. Pat. No. 3,308,069, the entire contents of which are incorporated herein by reference.

Of the catalysts comprising high silicon crystalline materials advantageously treated in accordance herwith, steam-deactivated catalysts comprising zeolites ZSM-5 and ZSM-11 are particularly noted. ZSM-5 is described in U.S. Pat. Nos. 3,702,886 and U.S. Pat. No. Re. 29,948, the entire contents of each being hereby incorporated by reference herein. ZSM-11 is described in U.S. Pat. No. 3,709,979, the entire teaching of which is incorporated herein by reference. Other catalysts comprising high silicon crystalline materials advantageously treated in accordance herewith include steam-deactivated catalysts comprising ZSM-5/ZSM-11 intermediate (U.S. Pat. No. 4,229,424, the entire contents of which are incorporated herein by reference), ZSM-12 (U.S. Pat. No. 3,832,449, the entire contents of which are incorporated herein by reference), ZSM-23 (U.S. Pat. No. 4,076,842, the entire contents of which are incorporated herein by reference), ZSM-35 (U.S. Pat. No. 4,016,245, the entire contents of which are incorporated herein by reference), and ZSM-38 (U.S. Pat. No. 4,046,859, the entire contents of which are incorporated herein by reference). Another such high silicon crystalline material is ZSM-48, described in U.S. Pat. No. 4,375,573, the entire contents of which are incorporated herein by reference. Catalysts comprising crystalline materials having varying amounts of structural aluminum as well as metals such as, for example, boron, chromium, iron, etc. are reactivated after steam deactivation by the present process regardless of what other materials or metals are present in the crystal structure.

The catalyst comprising zeolite which has been steam-deactivated may be composed of the crystalline zeolite alone or said zeolite and a matrix comprising another material normally resistant to the temperatuure and other conditions employed in a chemical conversion process. Such matrix material is useful as a binder and imparts greater resistance to the catalyst for the severe temperature, pressure and reactant feed stream velocity conditions encountered in many processes, such as, for example, cracking.

Useful matrix materials include both synthetic and naturally occurring substances, as well as inorganic materials such as clay, silica and/or metal oxides such as alumina. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of zeolite component and inorganic matrix, on an anhydrous basis, may vary widely with the zeolite content ranging from about 1 to about 99 percent by weight and more usually in the range of from about 5 to about 80 percent by weight of the dry composite.

The catalyst compositions reactivated by the process of the present invention are useful for a variety of organic, e.g. hydrocarbon, compound conversion processes. Such conversion processes include, as non-limiting examples, cracking hydrocarbons with reaction conditions including a temperature of from about 300° C. to about 700° C., a pressure of from about 0.1 atmosphere (bar) to about 30 atmospheres and a weight hourly space velocity of from about 0.1 to about 20; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmospheres and a weight hourly space velocity of from about 0.08 to about 20; alkylating aromatichydrocarbons, e.g. benzene and alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

In order to more fully illustrate the nature of the invention and the manner of practicing same, the following examples are presented. In the examples, whenever Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$). In the case of zeolite HZSM-5, for example, only 174 ppm of tetrahedrally coordinated aluminum are required to provide an Alpha Value of 1. The Alpha Test is described in U.S. Pat. No. 3,354,078 and in *The Journal of Catalysis*, Vol. IV, pp. 522-529 (August 1965), each incorporated herein by reference as to that description.

EXAMPLE 1

A sample of HZSM-5 zeolite (SI/Al atomic ratio of about 35) catalyst, calcined in flowing air at 538° C., was found to have an Alpha Value of 193. The catalyst was contacted with 100% steam for 90 minutes at 557° C. The steam contacted catalyst was again tested for activity in the Alpha Test and found to have an Alpha Value of only 28.

An aliquot of this steamed catalyst was contacted with a 1N NaHCO$_3$ (pH 8) aqueous solution for 4 hours at 80° C., water washed and then treated with a 1N (NH$_4$)$_2$SO$_4$ aqueous solution for 4 hours at 80° C. The catalyst was water washed to be sulfate-free and then dried at 130° C. for about 2 hours. The resultant catalyst was again tested for activity and found to have an Alpha Value of 63, a 125% increase in activity over that of the steamed catalyst.

EXAMPLE 2

A sample of the same HZSM-5 zeolite catalyst of Example 1 (calcined in flowing air at 538° C. and exhibiting an Alpha Value of 193), was treated with 100% steam for 90 minutes at 557° C. The steamed catalyst was found to have an Alpha Value of only 28.

An aliquot of this steamed catalyst was contacted with a 1N NaNO₃ aqueous solution for 4 hours at 80° C., water washed and then contacted with a 1N (NH₄)₂SO₄ aqueous solution for 4 hours at 80° C. The catalyst was then water washed to be sulfate-free and dried at 130° C. for about 2 hours. The resultant catalyst was found to have an Alpha Value of 126, a 350% improvement in activity over that of the steamed catalyst.

EXAMPLE 3

A sample of the same HZSM-5 zeolite catalyst of Example 1 (calcined in flowing air at 537° C. and exhibiting an Alpha Value of 193), was contacted with 100% steam for 24 hours at 454° C. The steamed catalyst was found to have an Alpha Value of only 28.

An aliquot of this steamed catalyst was contacted with a 1N NaNO₃ aqueous solution for 4 hours at 80° C., water washed and then contacted with a 1N (NH₄)₂SO₄ aqueous solution for 4 hours at 80° C. The catalyst was then water washed to be sulfate-free and dried at 130° C. for about 2 hours. The resultant catalyst was found to have an Alpha Value of 70, a 150% improvement in activity over that of the steamed catalyst.

EXAMPLE 4

A sample of the same HZSM-5 zeolite catalyst of Example 1 (calcined in flowing air at 537° C. and exhibiting an Alpha Value of 193), steam treated as in Example 3, was further steam treated for an additional 90 minutes at 537° C. This steamed catalyst proved to have an Alpha Value of only 27.

An aliquot of this steamed catalyst was contacted with a 1N NaNO₃ aqueous solution for 4 hours at 80° C., water washed and then contacted with a 1N (NH₄)₂SO₄ aqueous solution for 4 hours at 80° C. The catalyst was water washed to be sulfate-free and dried at 130° C. for about 2 hours. The resultant catalyst was found to have an Alpha Value of 59, a 96.5% improvement in activity over that of the steamed catalyst.

EXAMPLE 5

A sample of the same HZSM-5 zeolite catalyst of Example 1 (calcined in flowing air at 537° C. and exhibiting an Alpha Value of 193), steam treated as in Example 3, was further steam treated for an additional 90 minutes at 537° C. This steamed catalyst proved to have an Alpha Value of only 27.

An aliquot of this steamed catalyst was contacted with a 1N Zn(NO₃)₂ aqueous solution for 4 hours at 80° C., water washed and then contacted with a 1N (NH₄)₂SO₄ aqueous solution for 4 hours at 80° C. The catalyst was water washed to be sulfate-free and dried at 130° C. for about 2 hours. The resultant catalyst was found to have an Alpha Value of 68, a 152% increase in activity over that of the steam damaged catalyst.

COMPARATIVE EXAMPLE 6

A sample of the same steam treated HZSM-5 zeolite catalyst of Example 1 was twice contacted for 4 hours with an aqueous 1N (NH₄)₂SO₄ solution for 4 hours at 80° C. The catalyst was washed to be sulfate-free, dried at 130° C. and tested for Alpha Value as in Example 1. The Alpha Value proved to be 59.

COMPARATIVE EXAMPLE 7

A sample of the same steam treated HZSM-5 zeolite catalyst of Example 3 was twice contacted with an aqueous 1N (NH₄)₂SO₄ solution for 4 hours at 80° C. The catalyst was washed to be sulfate-free, then dried at 130° C. and tested for Alpha Value as in Example 3. The Alpha Value proved to be 43.

COMPARATIVE EXAMPLE 8

A sample of the same steam treated HZSM-5 zeolite catalyst of Example 4 was twice contacted with an aqueous 1N (NH₄)₂SO₄ solution for 4 hours at 80° C. The catalyst was washed to be sulfate-free, then dried at 130° C. and tested for Alpha Value as in Example 4. The Alpha Value proved to be 46.

The data from the above Examples is summarized in the following Table.

TABLE

ALPHA TEST CRACKING ACTIVITIES

| Example | Description | Activity, Alpha Value | Activity Relative to Steamed |
|---|---|---|---|
| Control | HZSM-5 calcined in flowing air at 537° C. | 193 | — |
| Control | HZSM-5 + steam 90 min/537° C. | 28 | 1.0 |
| Control | HZSM-5 + steam 24 hr/454° C. | 28 | 1.0 |
| Control | HZSM-5 + steam 24 hr/454° C. + steam 90 min/537° C. | 27 | 1.0 |
| 1 | HZSM-5 + steam 90 min/537° C. + NaHCO₃ + (NH₄)₂SO₄ | 63 | 2.3 |
| 2 | HZSM-5 + steam 90 min/537° C. + NaNO₃ + (NH₄)₂SO₄ | 126 | 4.5 |
| 3 | HZSM-5 + steam 24 hr/454° C. + NaNO₃ + (NH₄)₂SO₄ | 70 | 2.5 |
| 4 | HZSM-5 + steam 24 hr/454° C. + steam 90 min/537° C. + NaNO₃ + (NH₄)₂SO₄ | 59 | 2.2 |
| 5 | HZSM-5 + steam 24 hr/454° C. + steam 90 min/537° C. + Zn(NO₃)₂ + (NH₄)₂SO₄ | 68 | 2.5 |
| 6 | HZSM-5 + steam 90 min/537° C. + (NH₄)₂SO₄ | 59 | 2.1 |
| 7 | HZSM-5 + steam 24 hr/454° C. + (NH₄)₂SO₄ | 43 | 1.5 |
| 8 | HZSM-5 + steam 24 hr/454° C. + steam 90 min/537° C. + (NH₄)₂SO₄ | 46 | 1.7 |

The above data clearly show the greater reactivation for the doubly exchanged catalysts according to this invention (Examples 1–5) in comparison with catalysts only treated with an ammonium salt (Comparative Examples 6–8).

What is claimed is:

1. A process for reactivating a catalyst composition comprising a crystalline zeolite material having a silicon/aluminum atomic ratio of at least about 3.5, said catalyst composition having been contacted with steam under conditions sufficient to deactivate same by removal of aluminum from the zeolite framework, which comprises the steps of contacting said steam-deactivated catalyst composition with an aqueous metal salt solution of from about 0.05 N to about 5 N, said metal selected from the group consisting of alkali, alkaline earth and transition metals, at a temperature of from about 20° C. to about 100° C. for from about 15 minutes to about 240 minutes, and contacting said metal salt solution contacted catalyst composition with an aqueous ammonium ion solution of from about 0.05 N to about 5 N at a temperature of from about 20° C. to about 100° C. for from about 15 minutes to about 240 minutes.

2. The process of claim 1 wherein said crystalline zeolite material has a silicon/aluminum atomic ratio greater than 6.

3. The process of claim 1 wherein said crystalline zeolite material has a silicon/aluminum atomic ratio greater than 25.

4. The process of claim 1 which comprises the additional step of calcining said ammonium ion solution contacted catalyst composition at a temperature of from about 200° C. to about 600° C. for from about 1 minute to about 48 hours.

5. The process of claim 4 which comprises the additional step of water washing said metal salt solution contacted catalyst composition prior to said ammonium ion solution contacting step.

6. The process of claim 1 wherein said crystalline zeolite material is selected from the group consisting of large pore structure zeolites exhibiting a Constraint Index of less than about 1 and intermediate pore structure zeolites exhibiting a Constraint Index of from about 1 to about 12.

7. The process of claim 1 wherein said crystalline zeolite material is selected from the group consisting of those having the structures of ZSM-5, ZSM-11, ZSM-5/ZSM-11 intermediate, ZSM-12, ZSM-20. ZSM-23, ZSM-35, ZSM-38, ZSM-48 and zeolite Beta.

8. The process of claim 1 wherein said catalyst composition is a composite of said zeolite material and a matrix.

9. The process of claim 8 wherein said matrix is alumina.

* * * * *